United States Patent [19]

Smith

[11] Patent Number: 4,501,518

[45] Date of Patent: Feb. 26, 1985

[54] AUTOMATIC PNEUMATIC FEEDER

[75] Inventor: Thomas G. Smith, Woodstock, Canada

[73] Assignee: Pneuveyor Systems Limited, Woodstock, Canada

[21] Appl. No.: 448,667

[22] Filed: Dec. 10, 1982

[30] Foreign Application Priority Data

Aug. 17, 1982 [CA] Canada .................................. 409548

[51] Int. Cl.$^3$ ............................................. B65G 53/28
[52] U.S. Cl. ...................................... 406/25; 406/109
[58] Field of Search ............................ 406/12, 23–25, 406/109, 144, 145, 146; 137/625.5, 625.66

[56] References Cited

U.S. PATENT DOCUMENTS

| 3,372,958 | 3/1968 | Black . | |
|---|---|---|---|
| 3,403,941 | 10/1968 | Solt | 406/130 X |
| 3,861,830 | 1/1975 | Johnson | 406/146 X |
| 4,089,563 | 5/1978 | Neu | 406/125 |
| 4,168,864 | 9/1979 | Weeks | 406/109 X |
| 4,278,367 | 7/1981 | Jacobson | 406/109 |

FOREIGN PATENT DOCUMENTS 549508 12/1957 Canada .
685631 5/1964 Canada .
1038913 9/1978 Canada .

*Primary Examiner*—Jeffrey V. Nase
*Assistant Examiner*—Daniel R. Edelbrock
*Attorney, Agent, or Firm*—Lawrence I. Field

[57] ABSTRACT

A pneumatic material transference apparatus consisting of a closed hopper having a material inlet pipe at the top, a material outlet pipe at the bottom ending in a discharge chamber and a pneumatic operating system consisting of a valve chamber operatively connected to a control pipe, the upper end of which opens into the top of the hopper, the valve chamber having two valve seats, a valve disc associated with each valve seat, the valve discs being connected to each other by a valve stem such that when one disc is closed, the other one is open, a pressurized air supply chamber in cooperation with one of the valve discs and a vacuum chamber in cooperation with the other of the valve discs, an induction throat between the pressurized air supply and the discharge chamber, and a nozzle within the induction throat having an opening within the vacuum chamber.

6 Claims, 3 Drawing Figures

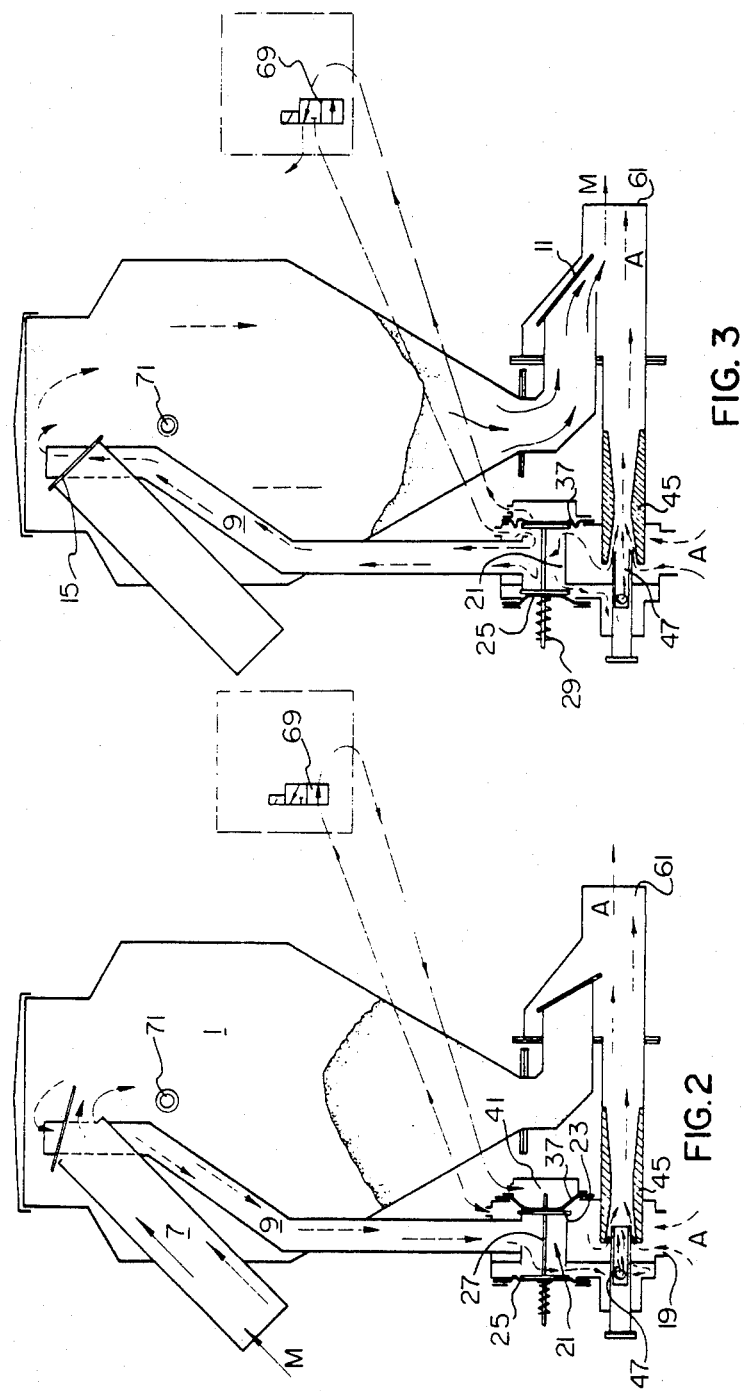

AUTOMATIC PNEUMATIC FEEDER

SUMMARY OF THE INVENTION

This invention relates to the pneumatic conveying of free flowing dry bulk material preferably, though not essentially, having a particle size of one eighth of an inch or less.

Generally, the apparatus of this invention consists of a hopper like feeder which intermittently draws particulate material from one storage and when the hopper or pod is full discharges it to another storage.

More specifically, the apparatus of this invention consists of a closed hopper or pod having a material intake near its upper end, a discharge opening at its lower end, and an induction nozzle and operating valve mechanism such that suction or pressurized air can be led to the top of the pod and pressurized air can be fed out through the discharge opening. The control valve is preferably operated by a pilot valve in conjunction with a pressure sensor which indicates when the discharge is empty, and a material level indicator. Of course other types of suitable control systems can be utilized for operating the control valve.

The apparatus is portable and can be utilized at any location for transferring particulate material from one storage to another, the only requirement being the need for a source of pressurized air.

The apparatus will now be described in detail with reference to the accompanying drawings in which:

BRIEF DESCRIPTION OF THE DRAWINGS

FIG. 1 is a diagrammatic view of the apparatus of FIG. 1 in the filling mode, and FIG. 3 is a diagrammatic view of the apparatus of FIG. 1 in the discharge mode.

DETAILED DESCRIPTION OF PREFERRED EMBODIMENTS

Figure 1:
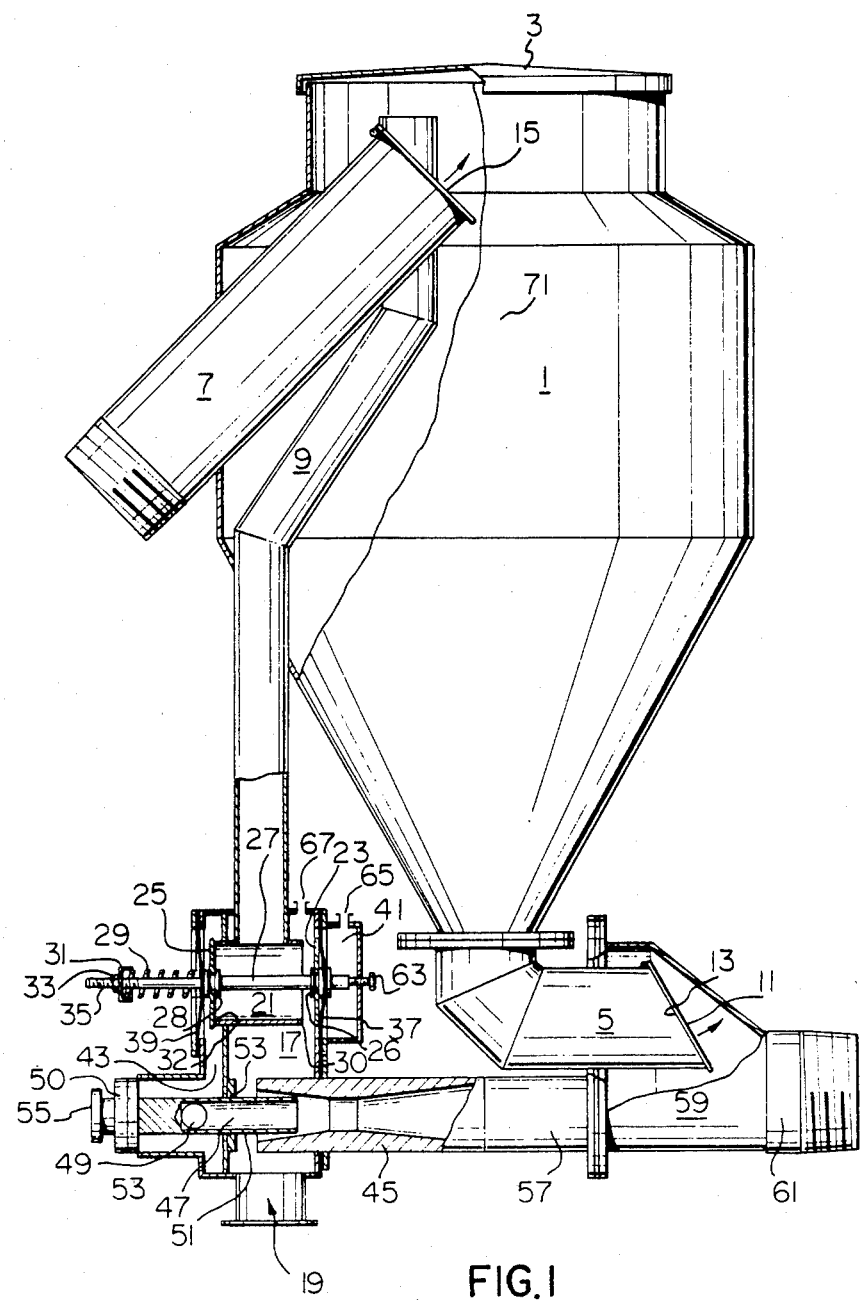
FIG. 1 is a part sectional view of one embodiment of the apparatus of this invention.

Referring to the drawings, the apparatus consists of a hopper or pod 1, an airtight access hatch 3 secured in a suitable well known manner to the top of the pod 1, a discharge outlet pipe 5, a material inlet pipe 7 and a control pipe 9. The discharge pipe 5 has a resilient flap valve 11 sealingly engagable with an inclined end 13 of the pipe 5. The material inlet pipe 7 is inclined upwardly into the pod 1 and has a resilient flap valve 15 at its upper end. At the lower end of the control pipe 9 is the operating mechanism and it consists of an air chamber 17 having an inlet 19 for pressurized air. Within the chamber 17 there is a double ended valve chamber 21 at the base of the control pipe 9. First valve disc 23 is secured to valve stem 27 through a fixed bushing 26 which is secured to first diaphragm 37, while second valve disc 25 is slidably secured to valve stem 27 through slidable bushing 28 which abuts diaphragm 39, such that when one disc 23 is closed upon its seat 30, the other disc 25 is open from its seat 32. The valve stem 27 is spring loaded against diaphragm 39 by coil spring 29, the spring loading being adjustable through a cap washer 31 and a nut 33 threaded onto the end of the valve stem 35. The diaphragm 37 forms one face of valve control chamber 41 and diaphragm 39 is a pressure balancing diaphragm, one side being exposed to atmospheric pressure while the other side forms part of one face of vacuum chamber 43.

In air chamber 17 there is also situated an induction throat 45 having a nozzle 47 which has an opening 49 in communication with vacuum chamber 43. The nozzle 47 is adjustable relative to the induction throat by having a sliding fit between outer surface 51 and nozzle supporting apertures 50 and 53. Movement of the nozzle 47 is accomplished by a suitable head 55. The downstream end of the throat 45 leads into a pipe 57 which is secured to a discharge chamber 59 into which the discharge tube 5 also leads. The actual discharge of material occurs through outlet 61. A bolt 63 is threaded into the side wall of chamber 41 and provides an adjustable stop to limit the amount of axial movement of the stem 27 after disc 25 is closed upon its seat 32.

A control port 65 together with a supply port 67 control the operation of the apparatus by being connected through piping to a pressure sensor and a pilot valve 69 (shown diagrammatically in FIGS. 2 and 3). Another control which can be used with the apparatus is a material level sensor 71 which can be coupled electrically or pneumatically to the pilot valve 69.

The operation of the apparatus will now be described with specific reference to FIGS. 2 and 3, the broken arrows A indicating air flow and the solid arrows M indicating material flow.

Referring to FIG. 2, in the filling mode of operation pressurized air is admitted at inlet 19, passes through supply port 67 to the pilot valve 69 which is in position to pressurize the valve control chamber 41 through control port 65. The diaphragm 37 then moves the valve stem 27 towards the left as shown in FIG. 2 so closing the disc 23 against its seat 30 and lifting disc 25 from its seat 32. The pressurized air also passes through the induction throat 45 and out through the discharge opening 61 so drawing air through the nozzle 47 and forming a vacuum in vacuum chamber 43 and valve chamber 21. The pod 1 is thus subjected to suction through control pipe 9 and this suction holds flap valve 11 closed, opens flap valve 15 and draws in material through the material inlet 7.

When the material reaches the level of the level sensor 71, a signal is passed to the pilot valve 69 and, as shown in FIG. 3, the pilot valve 69 operates to vent the valve control chamber 41 to atmosphere so moving the valve stem 27 towards the right as shown in FIG. 3 under the influence of pressure on the diaphragm 37 so seating disc 25 upon seat 32 and removing disc 23 from seat 30. Pressurized air is then passed through valve chamber 21 through control pipe 9 and into the top of the pod 1 so placing a pressure upon the top of the material in the pod 1. The flap valve 15 closes due to the force of gravity and under this elevated pressure. Pressurized air also passes through the throat 45 and out of the discharge opening 61 so carrying material with it through the open flap valve 11. When the discharge pipe becomes loaded with material, the pressure in the system rises, and at a pressure preset by spring 29, the disc 25 opens against the action of the spring and permits some of the pressurized air which was passing along the control pipe 9 into the top of the pod to be bypassed past disc 25, through nozzle 47, and into the discharge tube opening 61 to mix with the material being discharged. The system is therefore self-regulating in the discharge mode moving material from the pod into the discharge tube at the maximum permissible rate without clogging the discharge. When the pod is empty of material, the pressure in the system falls and the pressure sensor switches the pilot valve to again admit pressurized air to valve control chamber 41 so that the filling mode is repeated.

It has been found that acceptable conveying distances from a source of material to the pod 1 will normally be up to 20 feet and from the pod to the material storage will be up to 1000 feet. As an example, a rotary positive displacement air pump operating at from 12 to 15 pounds per square inch discharge pressure and moving one hundred cubic feet per minute of air in a two-inch diameter discharge conveying line and up to 900 cubic feet per minute of air in a six-inch diameter discharge conveying line can discharge approximately 5000 pounds per hour of material in a two-inch diameter pipe and approximately 50,000 pounds per hour of material in a six-inch diameter pipe. Of course, these figures vary depending upon the product being transferred and the distance involved in the transferance of the material. The size of the pod will preferably be between 3 and 10 cubic feet capacity and is sized to cycle between the fill and discharge modes between about 1 to 3 times per minute.

EXAMPLE

In a typical application, a manufacturing plant receives polyvinyl chloride resin by bulk hopper rail cars which hold approximately 180,000 pounds per rail car. The resin is stored in a storage silo and it is used in the process at the plant at a rate of 4000 pounds per hour. The total conveying distance from the rail car to the top of the storage silo is 100 feet and from the bottom of the silo to the process location is 200 feet.

RAIL CAR UNLOADING

A portable transfer assembly for the resin is situated beside the hopper rail car and this assembly comprises an 8 cubic foot net capacity transfer pod with a six-inch diameter intake and a 5-inch diameter discharge, an an electric motor driven air pump assembly of 600 cubic feet per minute capacity at 15 pounds per square inch. There is also an associated electric control panel and the whole assembly is mounted on a wheeled chassis.

With the hopper car connected to the pod intake via a 6-inch diameter 15 foot hose, and the pod discharge connected to a fixed 5-inch diameter silo fill line via a 5-inch diameter 20 foot hose, the operator starts the air pump then turns on the transfer pod.

The transfer pod will cycle once every 26 to 28 seconds, each time drawing approximately 280 pounds of resin from the rail car and transferring it to the storage silo. At this rate, which is 35,000 to 38,000 pounds per hour, the rail car should easily be emptied within one 8 hour shift.

SILO TO PROCESS

A stationary 3 cubic foot transfer pod is located adjacent to the silo discharge and 3 foot of 3 inch diameter pipe connects the silo to the pod intake. This pipe is inclined so that the resin must be drawn upwardly into the pod thus preventing gravity flow of material when the system is shut down. The pod discharges into 200 foot of 2½ inch diameter conveying line to the process hopper and an electric motor driven air pump delivering 150 cubic feet per minute at 15 pounds per square inch supplies air to the transfer pod.

When the process hopper requires resin, the air pump is started and the transfer pod cycles once every 35 to 40 seconds drawing approximately 100 pounds per cycle from the silo.

It will thus be seen that this invention provides an apparatus which very efficiently transfers material from one location to another.

It will be noted that because of the control system for regulating the material discharged from the pod which is dependent upon the pressure in the system, once the pod control system has been initially adjusted it will feed at its maximum capacity independent of the conveying distance or the material characteristics. Furthermore, because of the uniqueness of the control system, the discharge valve 11 is allowed to fully open in the discharge mode so allowing the passage of occasional lumps of material without jamming or damaging the valve.

It will also be noted that the nozzle can be adjusted relative to the throat from the outside of the apparatus while the apparatus is in operation so that the adjustment of the system can be maximized during operating conditions.

The only moving parts in contact with the material which is being conveyed are the simple resilient flap valves 11 and 15 which can be made of rubber or the like. These valves are not controlled by any mechanical apparatus and are tolerant of misalignment, material buildup and abrasive materials and hence are very reliable and are not prone to failure due to wear.

I claim:

1. A pneumatic material transfer apparatus comprising a sealed pod having an upwardly inclined material inlet pipe having an open upper end terminating inside said pod adjacent the upper end thereof and a resilient flap valve closing said upper end, a horizontal material outlet pipe having a resilient second flap valve and discharging into a discharge chamber below said pod, and a pneumatic operating system comprising a valve chamber, a control pipe communicating between the interior of said pod and said valve chamber, the upper end of said control pipe opening into said pod adjacent the top thereof, said valve chamber having first and second valve seats, first and second discs associated with said valve seats, said discs being mounted on a valve stem such that when said first disc is closed on its seat, said second disc is open from its seat, said first disc being fixed to said valve stem, and said second disc being slidable thereon, spring bias means urging said second disc toward said first disc, stop means on said valve stem limiting the motion of said second disc toward said first disc, a pressurized air supply chamber connected to said valve chamber by said first disc and a vacuum chamber connected to said valve chamber by said second disc, an induction throat between the pressurized air supply chamber and the discharge chamber, and an open ended nozzle positioned within and spaced from said throat, said nozzle having an opening within said vacuum chamber, a pilot valve connected between said pressurized air supply chamber and a valve control chamber adjacent said first disc, a first diaphragm forming a flexible wall between said valve chamber and said valve control chamber, permitting motion of said first disc between open and closed positions under control of pressure in said valve control chamber, a second diaphragm adjacent said second disc and slidable on said valve stem therewith and forming a flexible wall between said vacuum chamber and the atmosphere, said pilot valve having two positions, a first position connecting said valve control chamber to said pressurized air chamber, and a second position venting said valve control chamber to atmosphere.

2. The apparatus of claim 1 wherein said spring bias means is adjustable.

3. The apparatus of claim 1 and including adjustable means for limiting the separation of said first disc and said first seat.

4. The apparatus of claim 1 and including means for sensing the level of material in said pod and to cause said pilot valve to move from said first position to said second position.

5. The apparatus of claim 4 including means for moving said pilot valve from said second position to said first position when said pod is empty.

6. The apparatus of claim 1, wherein said nozzle is axially adjustable relative to said throat.

* * * * *